United States Patent
Krüger et al.

(10) Patent No.: US 8,692,209 B2
(45) Date of Patent: Apr. 8, 2014

(54) UV DISINFECTION SYSTEM FOR WASTE WATER AND DRINKING WATER INCLUDING A CLEANING DEVICE

(75) Inventors: Friedhelm Krüger, Lemgo (DE); Hans-Joachim Anton, Bielefeld (DE); Ralf Fiekens, Schloss Holte-Stukenbrock (DE); Ernst Martin Billing, Bielefeld (DE)

(73) Assignee: Xylem IP Holdings, LLC, White Plains, NY (US)

( * ) Notice: Subject to any disclaimer, the term of this patent is extended or adjusted under 35 U.S.C. 154(b) by 47 days.

(21) Appl. No.: 13/393,696

(22) PCT Filed: Sep. 2, 2010

(86) PCT No.: PCT/EP2010/005384
§ 371 (c)(1), (2), (4) Date: May 14, 2012

(87) PCT Pub. No.: WO2011/026619
PCT Pub. Date: Mar. 10, 2011

(65) Prior Publication Data
US 2012/0217420 A1    Aug. 30, 2012

(30) Foreign Application Priority Data
Sep. 2, 2009   (DE) .......................... 10 2009 039 655

(51) Int. Cl.
*C02F 1/32* (2006.01)
(52) U.S. Cl.
USPC ............................................. 250/431; 25/436
(58) Field of Classification Search
USPC ............. 250/431, 436, 455.11; 422/24, 186.3
See application file for complete search history.

(56) References Cited

U.S. PATENT DOCUMENTS

| 5,418,370 A | 5/1995 | Maarschalkerweerd |
| 5,874,740 A * | 2/1999 | Ishiyama ...................... 250/431 |

(Continued)

FOREIGN PATENT DOCUMENTS

| DE | 100 10 127 | 10/2001 |
| DE | 101 25 507 | 1/2003 |

(Continued)

OTHER PUBLICATIONS

International Preliminary Report corresponding to International Application No. PCT/EP2010/005384 dated Mar. 6, 2012.

(Continued)

*Primary Examiner* — Nikita Wells
*Assistant Examiner* — Johnnie L Smith
(74) *Attorney, Agent, or Firm* — RatnerPrestia

(57) ABSTRACT

A UV disinfection system for waste water and drinking water, includes a number of UV radiators arranged in cladding tubes, the cladding tubes being configured essentially symmetrically to a longitudinal axis, as well as a cleaning device for the cladding tubes. The cleaning device includes at least one cleaning ring for each cladding tube, which surrounds the cladding tube, the at least one cleaning ring having a scraper ring resting against the cladding tube, at least one drive for driving the cleaning ring in the direction of the longitudinal axis, and supply provisions for supplying pressurized fluid under elevated pressure from a pressure source to the scraper ring are provided, wherein pressure may be applied onto the scraper ring from the pressure source in the direction of the cladding tube.

14 Claims, 4 Drawing Sheets

(56) References Cited

U.S. PATENT DOCUMENTS

| | | | |
|---|---|---|---|
| 5,942,109 A | 8/1999 | Wuebker et al. | |
| 6,013,917 A * | 1/2000 | Ishiyama | 250/431 |
| 6,303,087 B1 | 10/2001 | Wedekamp | |
| RE38,173 E * | 7/2003 | Ishiyama | 250/431 |
| 6,659,431 B1 * | 12/2003 | Fang et al. | 250/431 |
| 6,863,078 B1 | 3/2005 | Dall'Armi et al. | |
| RE39,522 E * | 3/2007 | Ishiyama | 250/431 |
| 2003/0185727 A1 | 10/2003 | Menke | |
| 2004/0036033 A1 | 2/2004 | Snowball | |
| 2005/0061998 A1 | 3/2005 | Chen et al. | |
| 2012/0216843 A1 * | 8/2012 | Kruger et al. | 134/167 R |

FOREIGN PATENT DOCUMENTS

| | | |
|---|---|---|
| DE | 600 19 306 | 3/2006 |
| DE | 603 12 598 T2 | 12/2007 |
| EP | 0 811 579 | 12/1997 |
| GB | 2 360 035 | 9/2001 |

OTHER PUBLICATIONS

International Search Report corresponding to PCT/EP2010/005384, dated Dec. 20, 2010.

* cited by examiner

UV DISINFECTION SYSTEM FOR WASTE WATER AND DRINKING WATER INCLUDING A CLEANING DEVICE

CROSS REFERENCE TO RELATED APPLICATIONS

This application is the U.S. National Phase Patent Application of PCT International Application No. PCT/EP2010/005384, filed Sep. 2, 2010, which claims priority to German Patent Application No. 10 2009 039 655.1, filed Sep. 2, 2009, the contents of such applications being incorporated by reference herein.

FIELD OF THE INVENTION

The present invention relates to a UV disinfecting system for waste water and drinking water including a cleaning device comprising a number of UV radiators arranged in cladding tubes, said cladding tubes being configured essentially symmetrically to a longitudinal axis, as well as a cleaning device for the cladding tubes.

BACKGROUND OF THE INVENTION

It has been known for a long time that microbiologically loaded liquids such as waste water and drinking water may be treated by means of UV radiation. Here, even clarified waste water can be disinfected to such a degree that it may be introduced into rivers and bath waters. Drinking water can be disinfected by means of UV radiation, so that it is suitable for human consumption.

For disinfecting, low-pressure mercury radiators or medium-pressure mercury radiators are used, which are protected by cladding tubes and immersed into the water to be treated. The radiators and the cladding tubes are made from UV permeable material. In practice, quartz glass is used for this. The external surface of the cladding tubes is in direct contact with the surrounding liquid, and this is where any material depositing during operation over time separates from the surrounding liquid. This may be inorganic material such as, for example, lime. However, these may also be deposits of organic material.

As a result of the deposits on the external surfaces of the cladding tubes, the UV radiation emitted into the liquid will be reduced. In connection with the invention, reference will subsequently be made to an incrustation of the surface.

In order to remove such incrustations it was previously suggested to remove the radiators after an interruption of operation and then to clean the cladding tubes. It has also been suggested to clean radiators in closed channels in the case of an interruption of the liquid flow by flooding the channel with a liquid containing an acid. These solutions are not feasible for larger installations. Even an interruption of operation is disadvantageous.

Following that, various approaches for automatically cleaning the cladding tubes were developed. Each of these solutions is based on rings that are placed on top of the cylindrical cladding tubes and are then pushed along the cladding tubes by a drive. The mechanical contact between the ring and the cladding tube will then effect the cleaning. Depending on the application, various solutions have been proven to be feasible. In detail, the following solutions are known from the prior art:

U.S. Pat. No. 5,418,370 A, which is incorporated by reference, shows a cleaning device for a radiator cladding tube having a ring bearing against the cladding tube. The ring includes a chamber that is in communication with the cladding tube and into which a cleaning liquid is fed. Drive means are provided in order to move the ring along the cladding tube. In the course of this, the cleaning agent will gradually come into contact with the entire cladding tube surface and will effect there the removal of the incrustations. A similar solution is known from U.S. Pat. No. 6,013,917 A, which is incorporated by reference. Here, the cleaning ring includes two seals spaced from one another in the axial direction of the cladding tube, which seals seal the chamber against the surrounding liquid. Here it is suggested to feed the cleaning liquid into the chamber via a refill system, so that during a movement of the cleaning ring in the axial direction, the cleaning liquid will also come into contact with the surface over the entire length of the cladding tube and can separate the incrustations. What is problematic with this type of cleaning rings is the behaviour in the case of calcareous incrustations on the cladding tube surface. The chambers inside the rings are reliant on a seal against the surrounding liquid which is as good as possible. This seal gets damaged by calciferous incrustations, so that the cleaning liquid cannot be retained in the chamber and gets lost or an increased consumption occurs. In the case of drinking water applications it is also undesirable if substantial amounts of the cleaning liquid flow over into the drinking water.

DE 100 10 127 A1, which is incorporated by reference, suggests a cleaning ring, wherein the surface of the cladding tube is surrounded by an open-pored foam material. Cleaning liquid is fed into this foam material. Here, the elasticity of the foam material ensures that the cleaning ring will rest well against the surface of the cladding tube at all times. By virtue of the open pores, the cleaning liquid cannot escape into the surrounding water to an undesirable degree. This technical solution has proven to be useful for particularly calciferous water bodies. However, in continuous operation there is a risk that the cladding tubes will get scratched.

There are further cleaning rings that operate without the supply of cleaning liquid. These cleaning rings effect a purely mechanical cleaning of the cladding tube surface. Thus, a radiation system for the water of fish ponds is known from U.S. Pat. No. 5,942,109 A, which is incorporated by reference. What is suggested is a cleaning ring for a cladding tube of a UV radiator, which has brushes on the inside thereof. The brushes rest against the surface of the cladding tube and clean the cladding tube surface by means of an axial movement. For an application in the area of drinking water or waste water, such a solution has so far not been suggested. However, in continuous operation here, too, wear of the brushes and damage to the cladding tube surface have to be expected.

DE 600 19 306 T2, which is incorporated by reference, shows cleaning elements having elastomer rings and a chamber which is formed between two rings, respectively, into which rings a cleaning agent is to be fed.

DE 603 12 598 T2, which is incorporated by reference, shows a cleaning device comprising cleaning elements made from a wire material. The cleaning elements are elastically biased against the cladding tube surface and, during the cleaning operation, are driven in the axial direction of the cladding tube as well as additionally for rotation about the longitudinal axis.

Finally, DE 101 25 507 A1, which is incorporated by reference, shows a purely mechanically acting cleaning ring comprising a guide chamber and blades orientated vertically relative to the cladding tube surface in the guide chamber. The blades are configured as a helical ring which extends elastically around the cladding tube surface and, due to its elasticity, rests against the surface. This cleaning device adjusts itself to compensate for any wear. A high surface pressure of the cleaning ring against the cladding tube surface is achieved. However, in water bodies having a tendency to cause severe incrustations on the cladding tubes, the effect diminishes over time.

Therefore, no UV disinfection system is known from the prior art, wherein the cladding tube surface can be cleaned during running operation with a uniform effect even in the case of a high tendency to incrustations.

SUMMARY OF THE INVENTION

Disclosed herein is a UV disinfection system. The cladding tube surfaces can be cleaned during running operation with an effect that remains uniform even over longer periods of time.

A UV disinfection system for waste water and drinking water, comprises a number of UV radiators arranged in cladding tubes, said cladding tubes being configured essentially symmetrically to a longitudinal axis, as well as a cleaning device for the cladding tubes, which comprises the following: at least one cleaning ring for each cladding tube, which surrounds the cladding tube, said at least one cleaning ring having a scraper ring resting against the cladding tube, at least one drive means for driving the cleaning ring in the direction of the longitudinal axis, wherein supply means for supplying pressurised fluid under elevated pressure from a pressure source to the scraper ring are provided, and in that pressure may be applied onto the scraper ring rom the pressure source in the direction of the cladding tube.

Since supply means for supplying a pressurised fluid under elevated pressure from a pressure source to the scraper ring are provided and pressure can be applied onto the scraper ring from the pressurised fluid in the direction of the cladding tube, a uniform high contact pressure against the cladding tube surface can be achieved, which is additionally controllable via the applied pressure.

If a plurality of cleaning rings is provided with a common holder and a common supply for the pressurised fluid, for example via conduits extending in the holder, a common pressure source and a common drive may be used for a larger system having a plurality of radiators. In the case of larger amounts of incrustations it is advantageous if the cleaning ring has a number of nozzles in the axial direction in the vicinity of the scraper ring, which nozzles are vertically or obliquely directed towards the surface of the cladding tube, are arranged in the circumferential direction of the cleaning ring at a distance from one another and are spaced from the surface of the cladding tube, because in this way any coarse dirt accumulations may initially be removed in a contactless manner, which means they will not put any stress on the scraper ring. In this way, a longer service life of the scraper ring will be achieved and any scratching of the cladding tubes by the scraping motion will be reduced. It is of particular advantage here if the drive of the cleaning rings has a resting position in an end position in the axial direction of the cladding tubes and the nozzles are moved ahead of the scraper ring in respect of a movement from this end position. Then, in the case of an initial actuation after a longer break period, the coarse deposits will be removed first, before the scraper ring slides over the cladding tube surface.

If the nozzles are in communication with the supply means for a supply of pressurised fluid under elevated pressure, a common pressure source for the nozzles and the contact pressure of the scraper ring may be used.

Any electric driving components may be completely dispensed with, if the drive of the cleaning rings in the axial direction of the cladding tubes is carried out hydraulically, for example by means of a hydraulic cylinder.

The drive may be carried out electrically or hydraulically if a spindle drive is used as the drive. The drive may in particular be fed with the pressurised fluid.

It is advantageous particularly in applications in the area of drinking water if water is used as the pressurised fluid.

BRIEF DESCRIPTION OF THE DRAWINGS

Exemplary embodiments of the present invention will be described below by means of drawings, wherein.

DETAILED DESCRIPTION OF THE PREFERRED EMBODIMENTS

Figure 1:
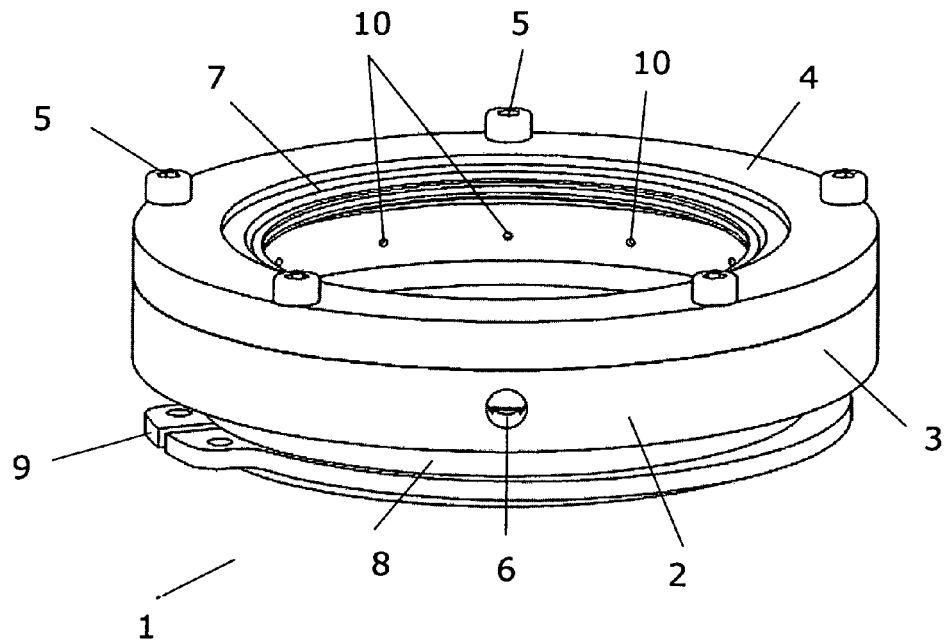
FIG. 1 shows a perspective view of a cleaning ring according to aspects of the invention, comprising a scraper ring and a spray ring.

In FIG. 1, a cleaning ring is generally identified with the reference numeral 1. The cleaning ring 1 comprises a two-piece base body 2 having a base portion 3 and a cover ring 4. The cover ring 4 is fastened to the base portion 3 with threaded screws 5. The base body 2 has a first connection 6 for a pressurised fluid. The cover ring 4 supports a scraper ring 7 made from a plastic material, said scraper ring being retained in a first groove 15 in the cover ring 4. Opposite the cover ring 4, a section 8 having a diameter that is reduced compared to that of the base body 2 is provided. Section 8 has a groove for receiving a securing ring 9 and is used for retaining the cleaning ring 1 in a device.

Inside of the base body 2, nozzles 10 can be seen, which are implemented as through bores and are open towards the inside. Overall, the cleaning ring 1 is approximately rotationally symmetric relative to an axis extending vertically in FIG. 1 and surrounds an annular clear opening, into which nozzles 10 are directed.

Figure 2:
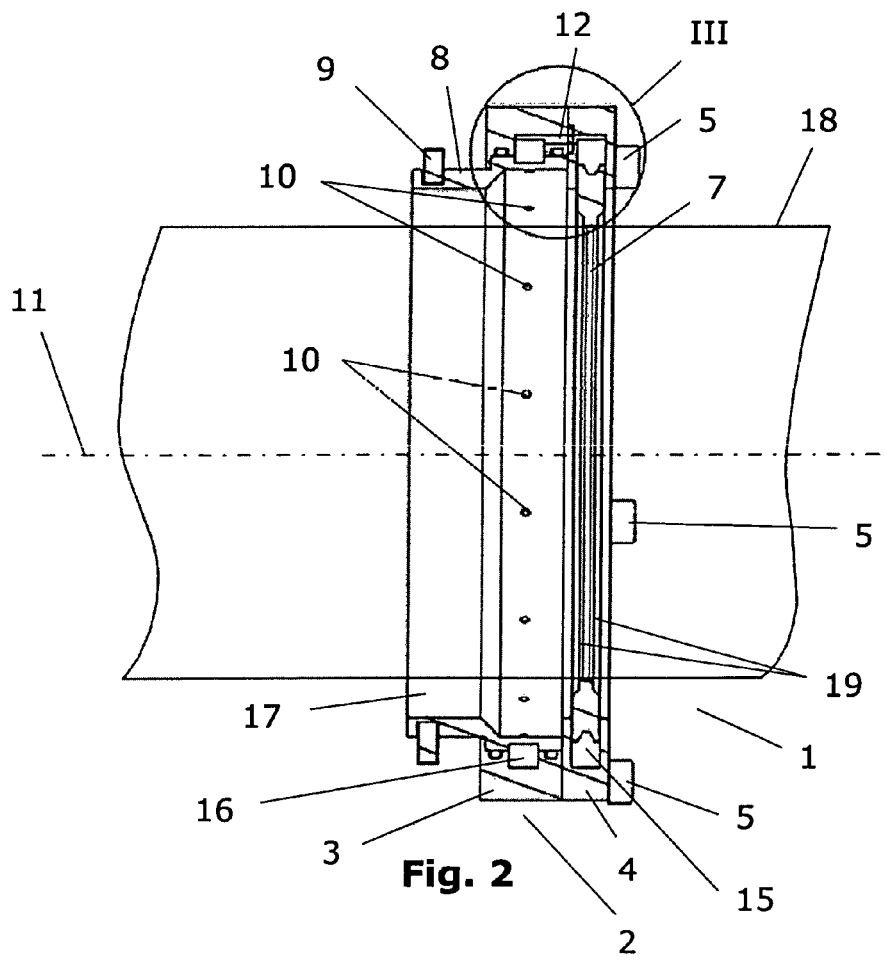
FIG. 2 shows a longitudinal section of a cleaning ring according to FIG. 1 with a cladding tube indicated.

FIG. 2 shows a longitudinal section of the cleaning ring 1 along a longitudinal axis 11. Identical components are identified with the same reference numerals.

The cover ring 4 is provided with a first groove 15 that is open towards the longitudinal axis 11. The first groove 15 has a rectangular cross section. The scraper ring 7 is inserted into the first groove 15 in such a way that it can radially slide therein, but seals against the groove walls. The base portion 3 of the cleaning ring 1 is also provided with a continuous second groove 16 which is open towards the longitudinal axis 11. The second groove 16 is covered on its open interior side with an insert 17 which is coaxially disposed in the base portion 3 relative to the longitudinal axis 11. The insert 17 supports the nozzles 10 already described, which are implemented as radial through bores and are in communication on the one hand with the second groove 16 and on the other hand with the internal space surrounded by the cleaning ring 1. The insert 17 further supports the section 8 having a tapering cross section, which section includes the securing ring 9.

A bore 12 disposed parallel to the longitudinal axis 11 connects the grooves 15 and 16. In FIG. 2, the first connection 6 from FIG. 1 is not shown. This first connection is in communication with the second groove 16 and consequently also with the first groove 15.

FIG. 2 further shows sections of a cladding tube 18 which is arranged concentrically to the longitudinal axis 11 and which in operation surrounds a UV radiator which is also orientated concentrically relative to the longitudinal axis 11. The UV radiator is not shown here to improve clarity. The scraper ring 7 rests against the external surface of the cladding tube 18 with two continuous lips 19. An annular gap is provided between the insert 17 and the surface of the cladding tube 18.

Figure 3:
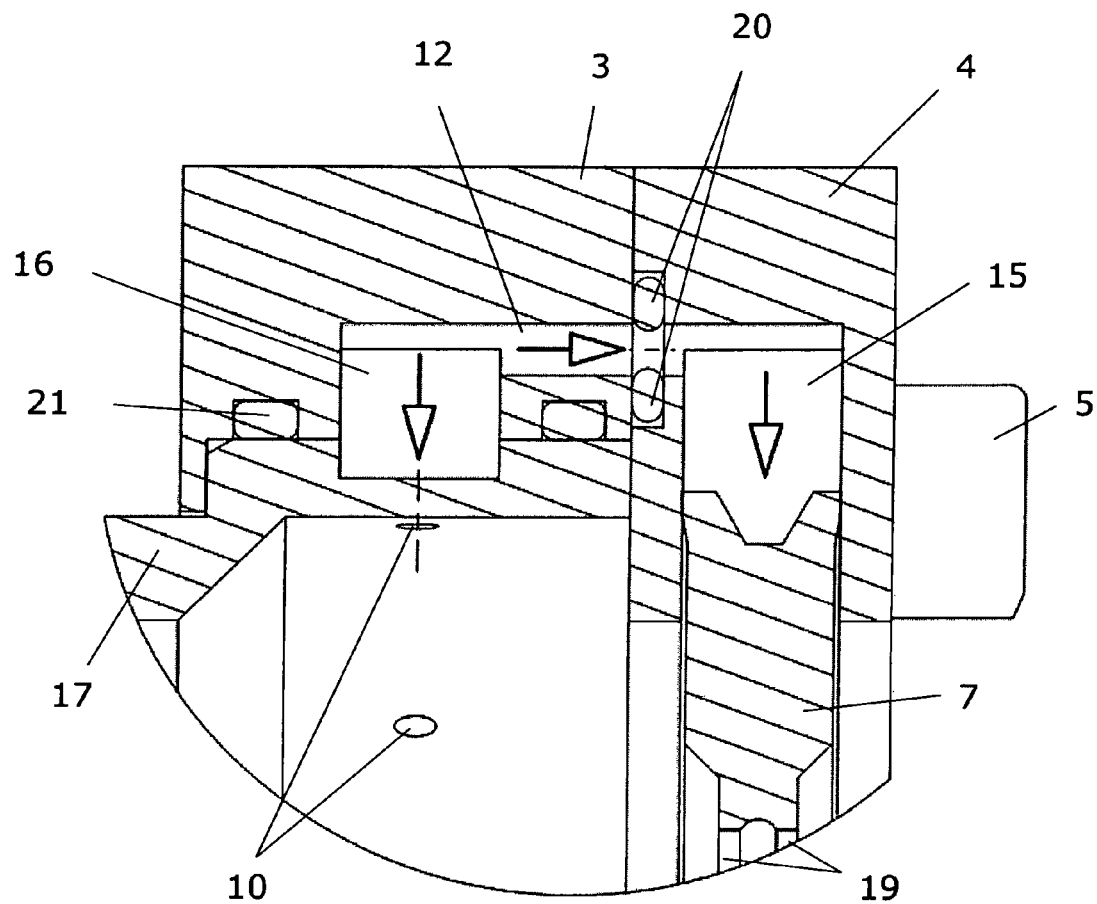
FIG. 3 shows an enlarged representation of detail III from FIG. 2.

FIG. 3 shows the cut-out III from FIG. 2 in an enlarged view. Identical components are again identified with the same reference numerals. The cladding tube 18 is not shown in this view.

The base portion 3 is sealed with an O-ring 20 against the cover ring 4 in the area of the bore 12. Similarly, the insert 17 is sealed against the base portion 3 with two further O-rings 21. The second groove 16 is in communication, as already described, with the nozzles 10 and with the first connection 6. The first groove 15 is sealed radially inwards by means of the scraper ring 7 resting against the groove walls. In this way a system of spaces is obtained which are located within the cleaning ring 1 and which are open towards the outside only through the first connection 6 and the nozzles 10. As a result, an application of pressure onto the first connection 6 and thus onto the second groove 16 will lead to an increase in pressure in the second groove 16, the bore 12 and the first groove 15. The fluid introduced there under pressure flows through the nozzles 10 radially inwards into the gap between the insert 17 and the cladding tube 18. The corresponding increase in pressure in the first groove 15 generates a force which pushes the scraper ring 7 radially inwards, i.e. towards the cladding tube 18.

Figure 4:
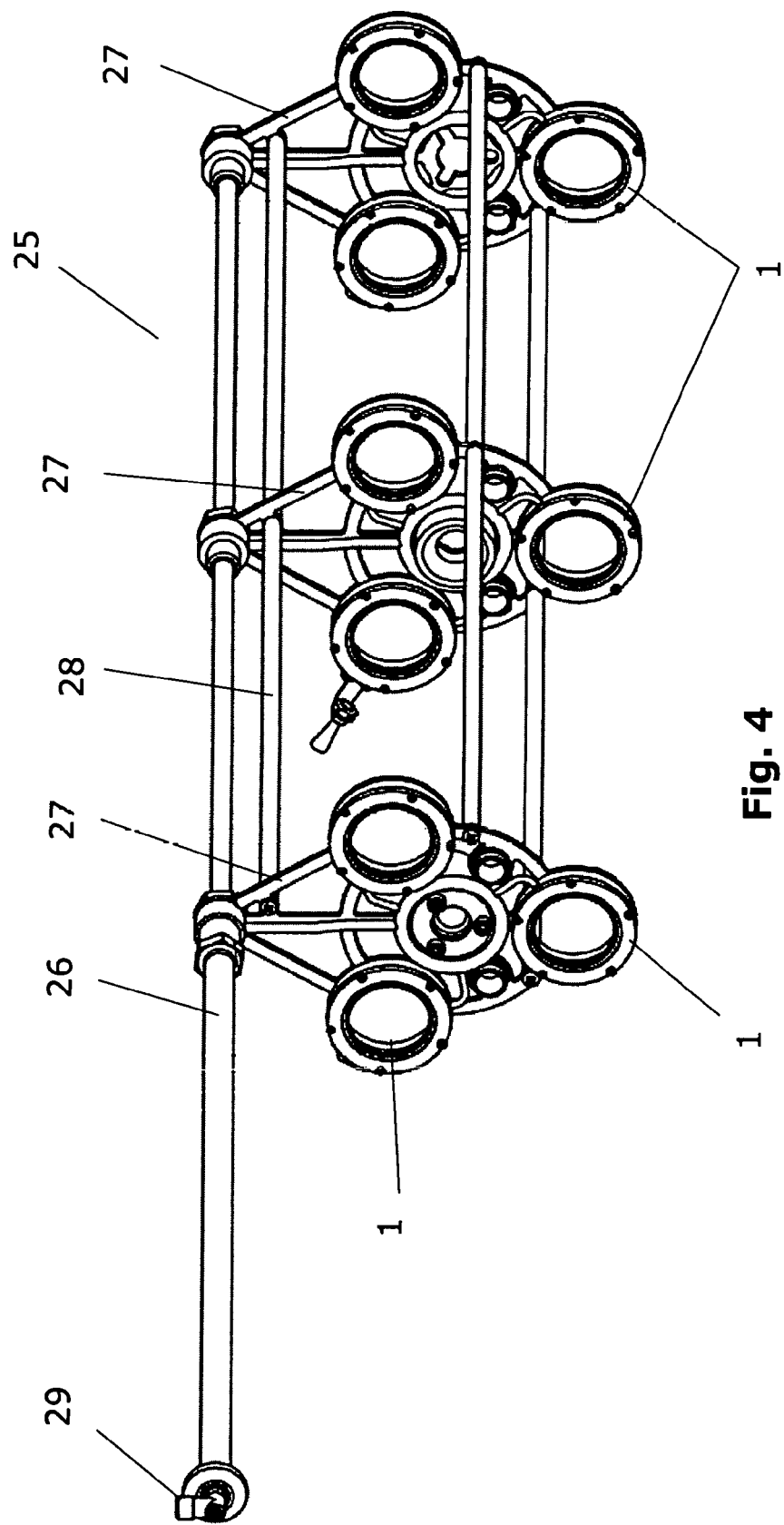
FIG. 4 shows a perspective view of a wiper unit including the associated holder and supply conduits for three radiators.

FIG. 4 shows a device, wherein a total of nine cleaning rings 1 are arranged in a common holder 25. The holder 25 comprises a connection tube 26, holding elements 27 and connection elements 28. The holding elements 27 are of essentially equal design and each hold three cleaning rings 1 and they are arranged at such a distance from one another that one cleaning ring 1 of each holding element 27 is respectively aligned with a second and a third cleaning rings 1 in relation to the longitudinal axis 11. The connection elements 28 keep the holding elements 27 spaced apart and parallel to one another.

Inside of the connection tube 26, a channel is disposed which may be fed with pressurised fluid via a second connection 29. The connection tube 26 is hollow and is in communication with corresponding channels in the holding elements 27, which in turn are in communication with the first connections 6 of the cleaning rings 1. As a result, an application of pressure on the second connection 29 leads to the above-described condition, wherein the scraper rings 7 are pressed radially inwards and the pressurised fluid exits from the nozzles 10.

In the course of this, pressurised fluid flows through the components 26, 27 and 29 which are used as supply means from the pressure source to the cleaning ring 1.

Figure 5:
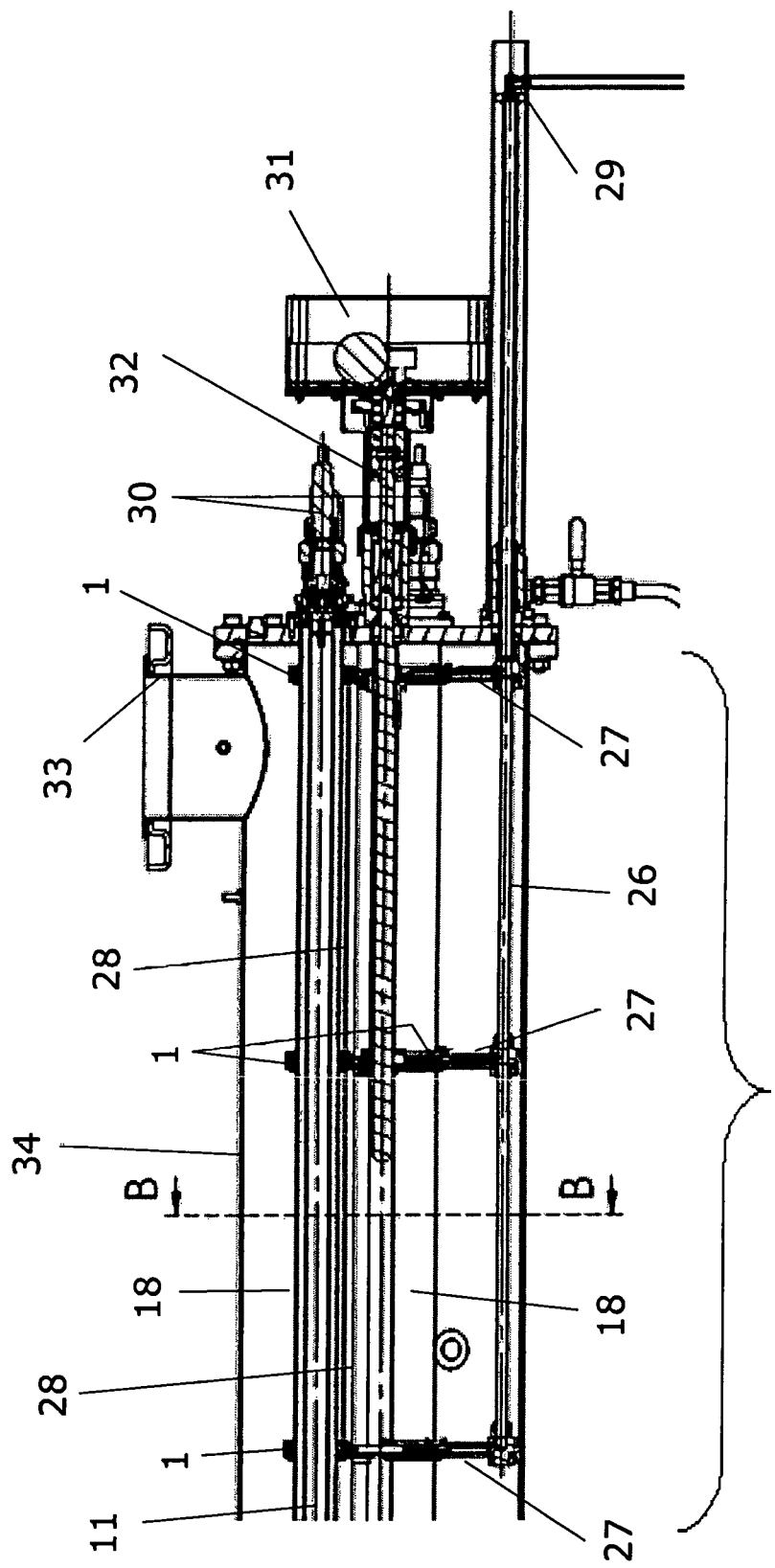
FIG. 5 shows the wiper unit according to FIG. 4 with an electric drive and a liquid supply, integrated in a closed radiation channel with three radiators.

The integration of the described device in a system for irradiating water in a closed radiation channel 34 made of stainless steel is shown in FIG. 5. The connection tube 26 is arranged here below the holding elements 27. As in FIG. 4, each of the holding elements 27 supports three cleaning rings 1, of which only two, respectively, can be seen in this view.

Inside the radiation channel 34, three UV radiators 30 are provided, which are mounted inside the cladding tubes 18. In this way, the UV radiators 30 are protected from direct contact with the water present in the radiation channel 34. However, the external surfaces of the cladding tubes 18 are in direct contact with the water.

An electric motor 31 having a corresponding transmission drives a spindle drive 32, which in turn is used to drive the holder 25 parallel to the axis 11.

In practice, water is fed through a connection fitting 33 into the radiation channel 34. The water flows around the cladding tubes 18 and exits the radiation channel 34 again at the opposite end through a corresponding fitting. In operation, the UV radiators 30 radiate UV radiation which is suitable for killing microorganisms in the water. In this way, the water is disinfected. The surface of the cladding tubes 18 is contaminated with lime constituents and organic substances. These contaminations build up to form incrustations which absorb UV radiation and therefore reduce the efficiency of the device.

In order to remove these surface incrustations from the cladding tubes 18, the cleaning rings 1 are moved to and fro in the longitudinal direction of the longitudinal axis 11 over the three cladding tubes 18 by means of the holder 25. To this end, the electric drive (electric motor 31, spindle drive 32) is started. At the same time, a pressurised fluid, for example water, is fed to the second connection 29. The fluid flows through the inner bore of the connection tube 26 and the channels in the holding elements 27 and enters the annular second groove 16 through the first connections 6. Subsequently, pressure is radially outwardly applied onto the scraper ring 7, so that the lips 19 are pressed against the surface of the cladding tubes 18. The fluid then flows from the nozzles 10 into the annular gap between the insert 17 and the cladding tube 18, where it creates turbulence that, due to the high flow velocity differences, leads to high shear forces which separate the incrustations to a substantial degree. The scraper ring 7 with the lips 19 then scrapes the already loosened incrustations essentially completely off from the surface of the cladding tube 18.

The cleaning ring 1 is preferably inserted in the holder 25 and the overall assembly according to FIG. 5 in such a way that in the resting position, the insert 17 faces towards the cladding tube 18 to be cleaned. When the system is then put into operation at the beginning of a cleaning operation, the insert 17 then moves ahead with the nozzles 10 and effects a first treatment of the incrustation, whereas the scraper ring 7 follows behind and can scrape off the remaining incrustations. In this way, the service life of the scraper ring 7 is extended. Moreover, the fluid exiting from the nozzles 10 flushes the incrustations out of the annular gap between the cleaning ring 1 and the cladding tube 18, which in FIG. 2 is on the left-hand side, because the right-hand side is closed by the scraper ring 7. In this way, the incrustations are already at least partially flushed out of the internal space of the cleaning ring 1 by the pressurised fluid and will thus not put any load on the scraper ring 7.

Simpler embodiments of the present invention may provide that only the scraper ring 7 and the associated first groove 15 are provided in a cleaning ring 1, whilst the insert 17 and the nozzles 10 may be omitted. This configuration will then allow a functioning mode as with conventional cleaning rings, which scrape the incrustations off only mechanically. However, an improved effect is achieved, because the scraper ring 7 is pressed radially against the surface of the cladding tube 18 and the scraper ring 7 is also readjusted to compensate for any wear occurring. The scraper ring 7 may be made from any suitable plastic material, for example from PTFE, which is sufficiently deformable for the application described herein and which is UV resistant.

A simplification of the described device may also consist in the fact that the electric drive (electric motor 31, spindle drive 32) may be omitted and a hydraulic drive may be provided, which is operated via the pressurised fluid used for cleaning. Here, single or double acting piston/cylinder assemblies or spindle drives working in a turbine-like fashion may be contemplated.

The invention claimed is:

1. A UV disinfection system for waste water and drinking water including a number of UV radiators arranged in cladding tubes that are configured substantially symmetrically to a longitudinal axis, and a cleaning device for the cladding tubes, said cleaning device comprising:
    at least one cleaning ring surrounding one of the cladding tubes, said at least one cleaning ring having a scraper ring resting against the cladding tube,
    at least one drive means for driving the cleaning ring in a direction of the longitudinal axis, and
    supply means for supplying pressurised fluid under elevated pressure from a pressure source to the scraper ring, wherein the pressurised fluid generates a force that pushes the scraper ring radially inward towards the cladding tube.

2. The UV disinfection system according to claim 1, wherein a plurality of cleaning rings are provided with a common holder and a common supply for the pressurised fluid.

3. The UV disinfection system according to claim 1, wherein the cleaning ring has a number of nozzles in a vicinity of the scraper ring, which nozzles are directed either vertically or obliquely onto a surface of the cladding tube, wherein the nozzles are arranged in a circumferential direction of the cleaning ring at a distance from each other and are spaced from the surface of the cladding tube.

4. The UV disinfection system according to claim 3, wherein the nozzles are in communication with the supply means for supplying pressurised fluid under elevated pressure.

5. The UV disinfection system according to claim 3, wherein the drive means of the cleaning rings has a resting position in an end position in the direction of the longitudinal axis of the cladding tubes, and wherein the nozzles move ahead of the scraper ring from the end position.

6. The UV disinfection system according to claim 1, wherein the drive means is hydraulic.

7. The UV disinfection system according to claim 1, wherein the hydraulic drive means is operated via the pressurised fluid.

8. The UV disinfection system according to claim 1, wherein water is used as the pressurised fluid.

9. The UV disinfection system according to claim 1, wherein the drive means is a hydraulic cylinder.

10. The UV disinfection system according to claim 1, wherein the drive means is a spindle drive.

11. The UV disinfection system according to claim 5, wherein the cleaning ring defines an internal space between the cleaning ring and the cladding tube, the internal space having an open end defined by an annular opening between the cleaning ring and the cladding tube in a longitudinal direction ahead of the scraper ring, and a closed end defined by the scraper ring in an opposite longitudinal direction.

12. A method of cleaning a UV disinfection system, comprising the steps of:
    a) providing the UV disinfection system having the cleaning device of claim 1, and
    b) supplying pressurized fluid to the at least one cleaning ring and moving the cleaning ring along the longitudinal axis of the cladding tubes.

13. The method of claim 12, wherein:
    the cleaning ring comprises a number of nozzles in a vicinity of the scraper ring, said nozzles directed either vertically or obliquely onto a surface of the cladding tube, the nozzles arranged in a circumferential direction of the cleaning ring at a distance from each other and spaced from the surface of the cladding tube;
    the drive means has a resting position with the cleaning ring adjacent a first end of the cladding tubes along the longitudinal axis, and is configured to move the cleaning ring from the first end toward a second end in a first longitudinal direction;
    the cleaning ring defines an internal space between the cleaning ring and the cladding tube, the internal space having an open end defined by an annular opening between the cleaning ring and the cladding tube in the first longitudinal direction relative to a closed end defined by the scraper ring;
    further comprising moving the cleaning ring such that the nozzles move ahead of the scraper ring in the first longitudinal direction.

14. The method of claim 13, wherein the pressurized fluid flowing from the nozzles creates turbulence and shear forces that effect a first treatment of incrustations on the cladding tubes and flushes incrustations removed by such first treatment from the internal space between the cleaning ring and the cladding tube.

* * * * *

UNITED STATES PATENT AND TRADEMARK OFFICE
CERTIFICATE OF CORRECTION

PATENT NO.        : 8,692,209 B2
APPLICATION NO.   : 13/393696
DATED             : April 8, 2014
INVENTOR(S)       : Krüger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 120 days.

Signed and Sealed this
Twenty-ninth Day of September, 2015

Michelle K. Lee
*Director of the United States Patent and Trademark Office*